United States Patent [19]
Tarbet

[11] 3,987,688
[45] Oct. 26, 1976

[54] ADJUSTABLE CONTROL CAM
[75] Inventor: Cecil Sidney Charles Tarbet, Cambridge, England
[73] Assignee: Cecil Instruments Manufacturing Limited, Cambridge, England
[22] Filed: Feb. 20, 1975
[21] Appl. No.: 551,421

[52] U.S. Cl. .............................. 74/568 FS; 74/569; 356/96; 200/153 LB
[51] Int. Cl.² .................... F16H 53/00; F16H 53/06
[58] Field of Search ........ 74/568 FS, 568 T, 568 M, 74/568 R, 567, 569; 200/18, 153 LB; 356/96, 97

[56] References Cited
UNITED STATES PATENTS

| | | | |
|---|---|---|---|
| 2,322,031 | 6/1943 | Kuebert | 74/568 FS X |
| 2,409,130 | 10/1946 | Lear | 74/568 FS X |
| 2,573,638 | 10/1951 | Bryant | 74/568 FS |
| 3,298,246 | 1/1967 | Rubinwitch | 74/568 FS X |
| 3,433,091 | 3/1969 | Jullien-Davin | 74/568 |

FOREIGN PATENTS OR APPLICATIONS

| | | | |
|---|---|---|---|
| 980,280 | 5/1951 | France | 74/568 FS |

*Primary Examiner*—Samuel Scott
*Assistant Examiner*—F. D. Shoemaker
*Attorney, Agent, or Firm*—Brisebois & Kruger

[57] ABSTRACT

The adjustable error correction cam mechanism which defines the error signal necessary to compensate for inequalities in the attenuation of the optical paths of a twin-beam spectrophotometer is of the kind utilizing a closewound helix of spring steel wire whose outer periphery constitutes the cam working surface. The cam follower is of an improved design, being formed as a slider instead of a roller in order to provide the necessary accuracy of operation.

3 Claims, 3 Drawing Figures

ADJUSTABLE CONTROL CAM

BACKGROUND OF THE INVENTION

In the field of comparative spectrophotometry, it is well known to split the optical beam of a spectrophotometer into two separate optical paths, and to compare the intensities of the beams after they have traversed separate samples. Because of limitations imposed by manufacturing tolerances and non-uniformity of optical materials used in such instruments, a variable differential will exist between the optical attenuations of the two paths, even with no samples present, and it is therefore necessary to compensate for this differential in order to maintain the accuracy of the instrument throughout its range.

One means of achieving this compensation is to derive an electrical compensating signal from a potentiometer which is adjusted by means of a cam which moves synchronously with the grating drive shaft. The cam is arranged to have an adjustable profile, which is set during manufacture to cause the signal from the potentiometer to be proportional to the attenuation differential throughout the range of adjustment of the instrument. Subsequent adjustment may be necessary during the life of the instrument to compensate for ageing of optical components. In this prior system, the cam has a cam surface which is constituted by a closed loop of arcuate strips, lying approximately on a cylindrical locus, and a cam follower engages the edges of these strips. Each strip is articulated at its ends to the immediately adjacent strips, by means of screws which pass through the strips and are received in corresponding posts carried on a base plate. The profile presented by the strips is thus adjustable by moving the points of articulation along the posts. In order to accommodate changes in length of the loop of strips as the individual strips are inclined more or less to a diametric plane of the cylindrical locus, each strip is drilled at one end with a circular hole, and slotted at its other end, to permit lost motion at each articulation.

It has been found that this type of cam is troublesome to set up, and that discontinuities in response can occur, especially adjacent the articulation points.

SUMMARY OF THE INVENTION

According to my invention, an improved cam mechanism for use in the error correction system of a twin-beam spectrophotometer comprises in combination an adjustable cam member of the kind whose working surface is constituted by the outer periphery of a close-wound helix of spring steel wire mounted by way of adjustable carrier members on a support member, and an improved cam follower which instead of being a rotatable roller is in the form of a slider member having a cam-engaging surface significantly longer than the pitch of the turns of the helix. My invention overcomes the problems of the known systems of articulated links without introducing any fluctuating error signal related to the ribbed profile of the helix.

DESCRIPTION OF THE PREFERRED EMBODIMENT

Figure 1:
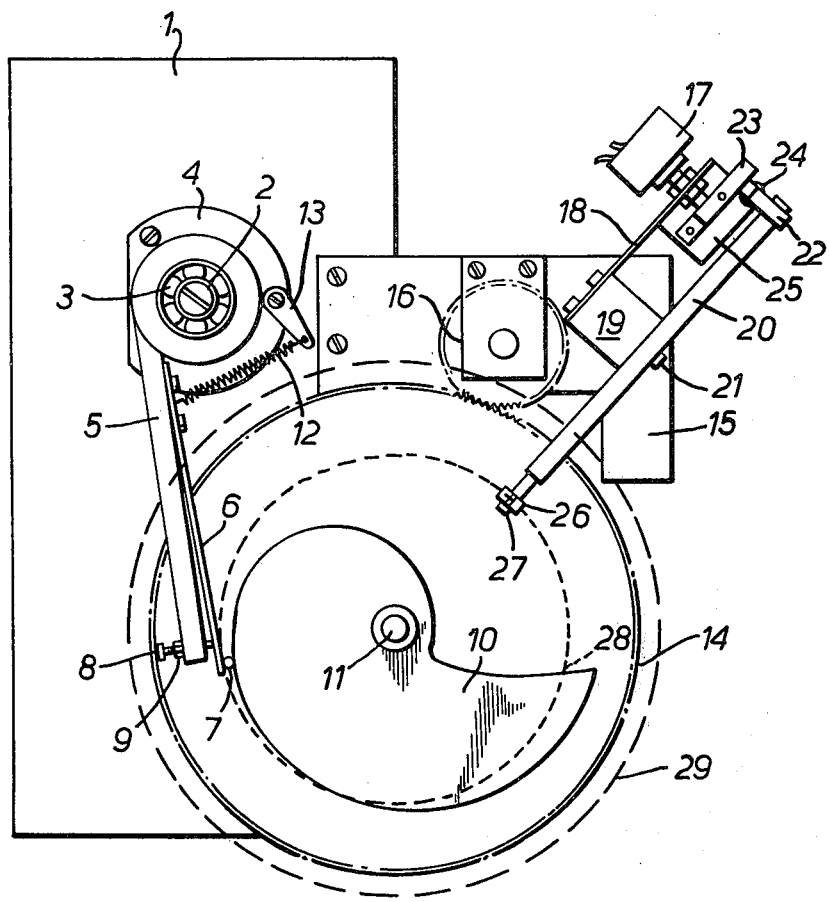
FIG. 1 is a diagrammatic plan view of a part of a spectrophotometer which has an error correction system employing a cam constructed in accordance with the invention.

Referring first to FIG. 1 for general orientation, the reference numeral 1 indicates the monochromator structure of a twin beam spectrophotometer. The grating of the instrument is carried on a shaft 2 which is journalled in a ball bearing 3 in a bearing block 4 secured to the monochromator 1. Adjustment of the angular position of the grating is effected by movement of a rod 5 secured to the shaft 2, and for this purpose, the rod carries a cam follower arm 6 provided with a cylindrical follower member 7. A screw 8 engaging a threaded bore in the rod 5 serves for fine adjustment of the position of the follower member 7 relative to the rod 5, and a lock nut 9 is provided to set the adjustment.

The cam follower co-operates with the periphery of a cam sector 10 mounted on a shaft 11 which is journalled on the monochromator, and the follower member 7 is maintained in contact with the cam sector by a tension spring 12 connected between the rod 5 and a stationary lug 13 secured by one of the mounting screws of the bearing block 4. Drive is transmitted to the shaft 11 via a gear wheel 14 secured to the latter, and it will be observed that rotation of the shaft 11 will cause the cam sector 10 to vary the angular position of the grating shaft 2.

The spectrophotometer illustrated in the drawing is provided with an electrical error correction system, and parts associated with this system are carried on a plate 15 mounted on the monochromator 1. The plate 15 also serves to journal a drive pinion 16 which meshes with the gear wheel 14. The error signal is derived from a potentiometer 17 which is carried by a plate 18. This plate is secured to a block 19 which is carried on the plate 15 and which also serves to support a lever 20, the latter being pivoted on a horizontally disposed pivot 21. Pivoting movement of the lever 20 is transmitted to the shaft of the potentiometer 17 by means of the engagement of the lever under an abutment rod 22 secured in a rectangular block 23 keyed to the shaft of the potentiometer. A spring 24 extends between the rod 22 and a projecting flange 25 on the plate 18 in order to maintain the engagement of the lever 20 and rod 22. It will be observed that the block 19 is so aligned on the plate 15 that the lever 20 extends radially towards the shaft 11, and that the end of the lever nearest the shaft carries a cam follower 26. This follower is rotatably secured on the lever by a shoulder screw 27, and it is arranged to engage on the underside of the cam track 28 of a cam plate 29 (see dotted lines in FIG. 1) which is mounted on the shaft 11 above the components illustrated in full lines relative to the plane of the paper. The spring 24 supplies the force necessary to maintain the follower 26 against the cam track 28, and the latter is contoured to determine the angular position of the shaft of the potentiometer according to the angular position of the cam plate 29, and hence of the grating of the instrument.

As has been discussed above, the purpose of the error correction system is to produce a signal which at all times corresponds to the differential which exists between the two beams of a twin beam spectrophotometer. This differential is not precisely predictable from machine to machine, and so the cam track 28 of the cam plate 29 has to have a contour, taken normally to the plane of the plate 29, which can be adjusted. In the illustrated machine, this requirement is met by forming the cam track 28 from a close-wound helix of spring steel wire. The means whereby the helix is held may be seen from FIGS. 2 and 3 of the drawings.

Figure 2:
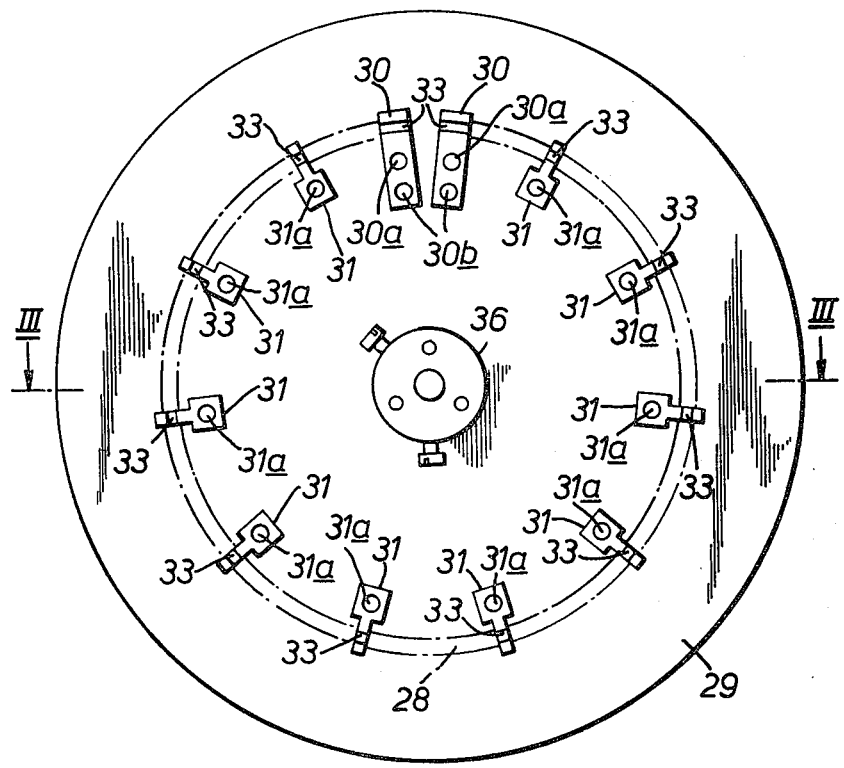
FIG. 2 is an underneath plan view of the cam used in the spectrophotometer of FIG. 1.

Referring to FIG. 2, two terminal cam track carriers 30 and ten intermediate cam track carriers 31 are provided on the cam plate 29. Each of the carriers 30 is formed with two tapped bores 30a, 30b and each of the carriers 31 is formed with a tapped hole 31a. The plate 29 is drilled to accept 4 B.A. screws 32 which engage in these tapped holes. The spacings of the holes in the plate are such that the centre lines of the two terminal carriers 30 lie at 15° to one another, the centre line of each of the immediately adjacent intermediate carriers 31 is spaced at 22½° from the centre line of the corresponding terminal carrier 30, and the spacing between each adjacent pair of intermediate carriers is 33⅓°. Each of the carriers 30 and 31 is formed of 0.25 in. square section brass rod, and is drilled at 33 with a hole 0.12 in. diameter so disposed that its circumference breaks out of the carrier by approximately 1/32 in. An appropriate length of a close wound helix of spring steel wire of 0.12 in. outside diameter is threaded through the holes 33 until it adopts the position shown in dotted lines in FIG. 2. This length of helical coil now constitutes the cam track 28, and its adjustment will be described with reference to FIG. 3.

Figure 3:
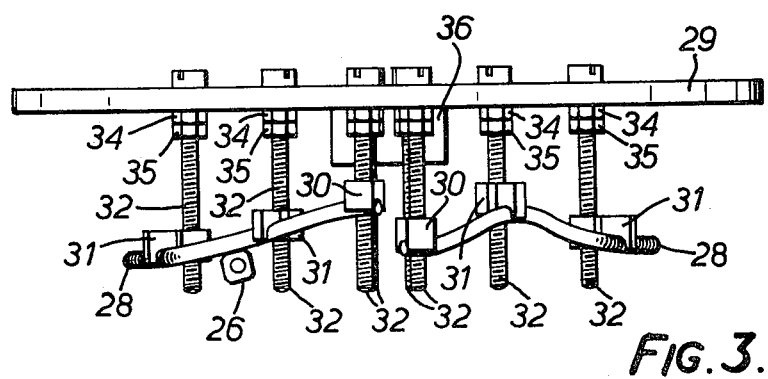
FIG. 3 is a side elevation of one half of the cam of FIG. 2, looking towards the diameter III—III in the direction of the arrows.

As can be seen from FIG. 3, each of the screws 32 is retained in the corresponding hole in the plate 29 by means of a pair of nuts 34, 35 locked against each other to form a stop. Each screw 32 thus forms a leadscrew for the corresponding carrier, and since the carriers cannot rotate, either because they are secured by two screws as in the case of the carriers 30, or because of their engagement with the helix, the screws 32 may be rotated to adjust the distance of the carriers from the plate. In this way the contours of the cam may be adjusted as desired, and the cam follower 26 can be caused to follow any desired locus. The shape of the cam follower 26 indicated in FIG. 3 is basically a 0.25" square, having its corners rounded off by radii of 0.125" merging into the straight sides. It will be readily observed that the cam follower 26 engages the helix as a slider, in contrast to the customary roller. This cam follower has been found to give satisfactory performance with the 0.12 in. helix, which is wound from 0.028 in. spring steel wire at 30 turns per inch. It will be observed that the length of each side of the cam follower is significantly longer than the pitch of the helix, so that it will at all times engage more than one turn of the latter during normal operating movement.

In use, the cam plate 29 is fitted by its central boss 36 to the shaft 11 and the screws 32 adjusted so that the potentiometer 17 balances the outputs from the instrument as the grating is rotated with no samples in the optical paths, thus correcting the unavoidable departures from beam balance of the instrument. I have found that the use of a helix of spring steel wire has produced a robust, flexible cam which can be readily followed, but which has sufficient elasticity to stretch as required when it is adjusted out of parallelism with the plane of the plate 29. Furthermore, the helix provides a continuous cam surface which causes no difficulty at points between regions of different inclination and the improved cam follower ensures that the accuracy of the mechanism employing such a helix is adequate for a precision analytical instrument. The instrument illustrated in the drawings has in fact proved remarkably easy to set up during testing, and of the highest accuracy in use. This we attribute to the general advantages offered by the improved cam mechanism of the invention.

Although the invention has been described with reference to the correction of errors in a twin-beam spectrophotometer, it has application in any situation where a flexible cam is required.

I claim:
1. In a cam mechanism comprising in combination
   a. an adjustable cam member having a working surface constituted by the outer periphery of a close-wound helix of spring steel wire, said cam member comprising adjustable carrier members by means of which said helix is mounted on a support member, and
   b. a cam follower the improvement according to which said cam follower is a slider having a cam-engaging surface significantly longer in the direction of relative cam movement than the pitch of the turns of the helix.

2. A cam mechanism according to claim 1 wherein said cam follower is rockably mounted on a cam follower arm.

3. A cam mechanism according to claim 2 wherein the cam-engaging surface of said cam follower is flat.

* * * * *

UNITED STATES PATENT OFFICE
CERTIFICATE OF CORRECTION

PATENT NO. : 3,987,688
DATED : October 26, 1976
INVENTOR(S) : CECIL SIDNEY CHARLES TARBET It is certified that error appears in the above-identified patent and that said Letters Patent are hereby corrected as shown below:

[30] Foreign Application Priority Data

Great Britain......No. 8331/74........Feb. 23, 1974

Signed and Sealed this

Twenty-second Day of March 1977

[SEAL]

Attest:

RUTH C. MASON
*Attesting Officer*

C. MARSHALL DANN
*Commissioner of Patents and Trademarks*